United States Patent [19]

Dassel

[11] 3,928,475

[45] Dec. 23, 1975

[54] AZEOTROPIC NITRATION OF BENZENE

[75] Inventor: Mark W. Dassel, Alloway, N.J.

[73] Assignee: E. I. Du Pont de Nemours & Co., Wilmington, Del.

[22] Filed: Aug. 9, 1974

[21] Appl. No.: 497,047

[52] U.S. Cl. ............................... 260/645; 260/688
[51] Int. Cl.² .......................................... C07C 79/10
[58] Field of Search ........................... 260/645, 688

[56] References Cited
OTHER PUBLICATIONS

Urbanski, Chemistry and Technology of Explosives, Vol. I, The MacMillan Co., New York, 1964, pp. 232 to 233.

Primary Examiner—Leland A. Sebastian

[57] ABSTRACT

A process for the mononitration of benzene wherein the nitration is carried out at temperatures of at least 120°C. in mixed $HNO_3$—$H_2SO_4$ and excess water is carried overhead as an azeotrope with part of the benzene and is then decanted from the benzene. The heat of nitration can be used to vaporize the azeotrope. The nitrated benzene product is removed as bottoms and decanted from the acid phase. This avoids the necessity of reconcentratingn the $H_2SO_4$.

13 Claims, 1 Drawing Figure

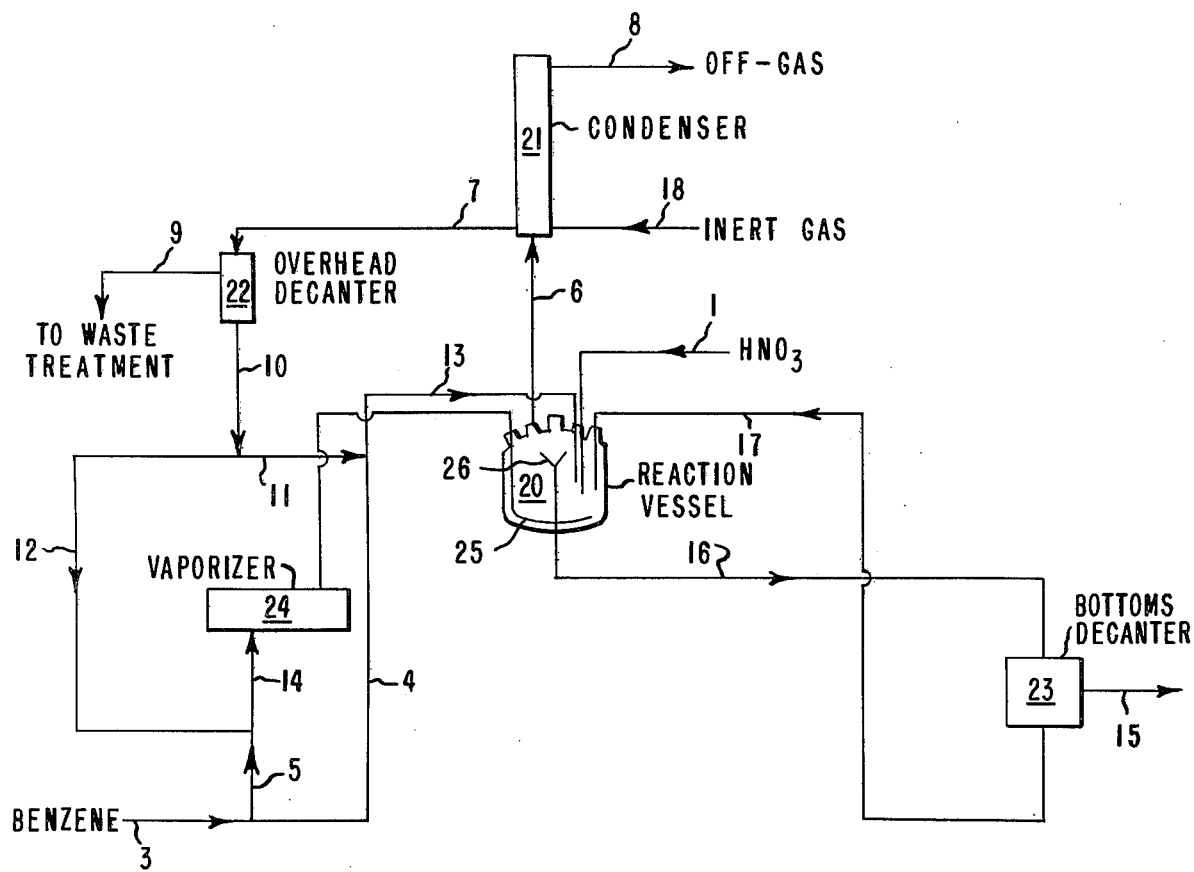

3,928,475

AZEOTROPIC NITRATION OF BENZENE

BACKGROUND OF THE INVENTION

1. Field of the Invention

This invention relates to a process for the nitration of benzene. More particularly, it relates to an azeotropic process for the mononitration of benzene in mixed acids.

2. Description of the Prior Art

The nitration of aromatic hydrocarbons is a process of great commercial importance. Of particular importance is the mononitration of benzene.

A number of processes have been developed for nitrating aromatic hydrocarbons. Historically, the preparation of mononitrobenzene, sometimes referred to herein as nitrobenzene, has been a batch process, a typical nitrating agent being a mixed acid initially of about 32% $HNO_3$, 60% $H_2SO_4$ and 8% water. (All parts, percentages and proportions herein are by weight except where indicated otherwise.) The reaction is highly exothermic, and the process is potentially explosive. For a variety of reasons—one of which is safety—the reaction has been controlled by slowly feeding one of the reactants to the other, and removing the reaction heat by external cooling. The initial reaction temperature is about 60°C. but is allowed to rise to about 90°C. near the end of the reaction period. As is well known, the final reaction mass is a two-phase system of nitrobenzene and sulfuric acid diluted with by-product water. The sulfuric acid can be separated by decantation and, for economic reasons, must be denitrated and reconcentrated, a process which involves substantial costs.

Another process for the production of nitrobenzene is disclosed in U.S. Pat. No. 2,256,999 to Castner (1941). In the Castner process, the mixed acid initially contains less than 10% $HNO_3$, preferably 2 to 6% $HNO_3$. The initial reaction temperature is about 90°C. (obtained by mixing the $H_2SO_4$ and $HNO_3$), and the final reaction temperature is about 110°C. The small amount of $HNO_3$ facilitates its complete reaction with the organics. This avoids the need for denitrating the acid before it is reconcentrated, and it permits conservation of the heat of reaction in the recycled acid.

In addition to batch processes with mixed acids, nitrobenzene has also been made in continuous mixed acid processes and in nitric acid processes not using sulfuric acid.

U.S. Pat. No. 2,773,911 — Dubois et al. (1956) describes a continuous process operating at 46° to 93°C. for the mixed acid nitration of benzene. The reactor effluent is separated into two phases comparable to the phases occuring in batch nitrations. These phases are processed to purify the nitrobenzene and reconcentrate the spent acid.

Nitric acid alone without sulfuric acid was used in the nitration of benzene with the excess water being removed overhead as an azeotrope with benzene as reported by Othmer et al., Industrial Engineering Chemistry 34, 286 (1942). Subsequently, others also worked with azeotropic removal of water from a nitration in nitric acid alone. U.S. Pat. Nos. 2,435,314 and 2,435,544 — Kokatnur (1948) say that the distillation avoids the need for the dehydrating effect of sulfuric acid. Although those patents show some nitrations at temperatures of 130° to 150°C., benzene nitration is done at temperatures up to 100°C.

U.S. Pat. No. 2,739,174 — Ross (1956) nitrates benzene or toluene at 100° to 120°C. with nitric acid only and uses azeotropic distillation of a bottom stream to separate the nitrated hydrocarbon and water from the $HNO_3$.

However, all of these processes using nitric acid alone without sulfuric acid are less than optimum in commercially important features such as reaction rate. The temperature of the reaction is limited to minimize hazards, and the production of oxidation products such as dinitrophenol by the low concentration nitric acid.

An attempt to combine mixed acid nitration and azeotropic distillation of water and benzene is shown in U.S. Pat. No. 2,370,558 — Mares (1945). The mononitration of benzene in batch and continuous processes is shown at temperatures in the range of 45° to 60°C., and it is stated that it could be done at from 40° to 90°C. Vacuum is used to aid in drawing off the azeotrope of water and benzene. Higher temperature reactions are said to be hazardous and difficult to control; however, reaction rates using this process are not as rapid as would be desired for modern-day operations.

Accordingly, it would be desirable to find a process which can operate efficiently and at a higher production rate than the prior art while not being hazardous.

SUMMARY OF THE INVENTION

The present invention, in certain of its embodiments, provides a continuous process for the mononitration of benzene comprising the steps of feeding fresh benzene and nitric acid in about stoichiometric proportions to produce nitrobenzene into a reaction vessel containing nitrobenzene, benzene and sulfuric acid;

mixing the ingredients in the reaction vessel and reacting benzene and nitric acid at a temperature in the range of about 120° to 160°C.;

vaporizing an azeotrope of a water phase containing nitric acid and a hydrocarbon phase containing benzene and nitrobenzene, and removing the azeotrope from the reaction vessel;

condensing the azeotrope, separating the aqueous phase from the hydrocarbon phase;

feeding excess benzene into the reaction vessel to maintain the total input of benzene to the reaction vessel above stoichiometric relative to the nitric acid fed thereto and to enhance the vaporization of the azeotrope, said excess benzene being either recycle stream of the hydrocarbon phase from the condensed azeotrope, or fresh benzene, or a combination of both; and withdrawing from the reaction vessel a mixture of acids and nitrobenzene, separating the nitrobenzene as product, and recycling the acids to the reaction vessel;

with the sulfuric acid concentration in the reaction vessel being controlled within the range of 55 to 70 percent by weight relative to the sulfuric acid plus water present by adjusting one or more of the reaction temperature and the rates of feeding nitric acid and benzene to the reaction vessel.

Preferably the azeotrope is taken off overhead, condensed and then separated into aqueous and hydrocarbon phases by decantation. The acids and nitrobenzene are also preferably separated from the bottoms stream by decantation. Heating and mixing of the ingredients in the reaction vessel can be aided by sparging benzene which is partially or entirely gaseous up through the other ingredients in liquid form.

The concentration of the sulfuric acid in the reaction vessel can be kept relatively constant by decanting off from the azeotrope condensed overhead an amount of water about equal to the amount of water added to the reaction vessel with the nitric acid and that produced by the chemical reaction of nitric acid and benzene.

Various feedbacks can be used to optimize the energy and materials efficiencies of the process, with any benzene removed in the bottoms stream also being recycled to the reaction vessel. Also, the azeotrope removed overhead from the reaction vessel can be distilled to lower the concentration of nitric acid before separating the hydrocarbon phase from the aqueous phase.

Preferably the pressure in the reaction vessel is kept above about 1 atmosphere and below about 2 atmospheres. Also, higher material efficiency is obtained and excessive concentrations of nitric acid in the reaction vessel can be prevented by maintaining the concentration of nitric acid in the aqueous phase of the condensed azeotrope below about 4 percent, preferably below about 2.5 percent.

BRIEF DESCRIPTION OF THE DRAWING

The sole FIGURE of the drawing is a schematic flow diagram of a process illustrating a preferred embodiment of the invention.

DESCRIPTION OF THE PREFERRED EMBODIMENTS

The present invention involves the discovery that mixed acid mononitration of benzene can be carried out safely and with greater efficiency at temperatures much higher than previously used.

Excess water is removed overhead as its azeotrope with benzene fast enough to retain the well known catalytic effect of high sulfuric acid concentration and thereby permit the concentration of nitric acid in the reaction vessel and in the azeotrope to be kept low. This minimizes possible hazards of localized over-concentration of nitric acid and also minimizes materials losses from nitric acid in the overhead and from the formation of dinitrobenzene. Economically quite important is the fact that, with the excess water being removed overhead and with the nitric acid concentration being kept low, the need for reconcentrating the sulfuric acid from the bottom stream is eliminated. The acids separated in the bottoms decanter can be directly and continuously returned to the reaction vessel. Furthermore, the use of reaction temperatures above about 120°C. facilitates vaporization of the azeotrope at atmospheric or higher pressures. This eliminates the need for investment in costly vacuum vessels and pumps. Such high temperatures produce high reaction rates for given parameters, allowing lower investment for smaller equipment. Also, the high temperatures facilitate rapid separation by decantation, making high production rates feasible.

The ingredients used in the reaction, the benzene and nitric and sulfuric acids, should be of suitable commercial quality. The sulfuric acid supplied can be of 50 to 85 percent strength, relative to water plus acid, and should equilibrate at about 65 percent during the reaction. Suitable acid-resistant materials of construction known in the art, such as glass-lined steel, are used for the equipment.

Turning now to the drawing, the four major pieces of equipment used are reaction vessel 20, condenser 21, overhead decanter 22, and bottoms decanter 23, suitably interconnected as shown.

The ingredients will form two phases in the reaction vessel, one inorganic and the other organic. The inorganic phase will be the water and sulfuric and nitric acids. The organic phase will be principally mononitrobenzene with some benzene and traces of miscellaneous by-products including the oxidation product dinitrophenol and perhaps some dinitrobenzene.

During the reaction the two phases are intimately mixed by suitable means. In some instances the mixing can be obtained by mechanical agitation or be feeding the aromatic raw materials as a vapor from a number of openings below the surface of the liquid in the reactor. Preferably, the vapors are bubbled throughout the reaction bath from a sparger near the bottom of the reaction vessel.

The relative amounts of the phases can vary widely, the volume ratio of organic material to inorganic material varying from about 0.1 to about 9.0, preferably being about 1.0.

To carry out the nitration process of the present invention, reaction vessel 20 and bottoms decanter 23 are preferably charged through line 1 with a heel of strong sulfuric acid, such as 65 percent strength, and nitrobenzene. The heel, heated to the reaction temperature, is circulated from reaction vessel 20 to bottoms decanter 23 through line 16 and back to reaction vessel 20 through line 17. Thereupon is started to the heel a continuous feed of benzene and, concurrently, an equivalent amount of nitric acid of any convenient concentrations, such as 63 percent strength. Initially, the benzene is fed in amounts above stoichiometric relative to the nitric acid fed to the reaction vessel to aid in producing the azeotrope. However, in steady-state continuous operation, the feed of fresh benzene and nitric acid should be essentially balanced stoichiometrically such as within a few percent. The recycled benzene keeps an excess of benzene in the reaction vessel and keeps the azeotrope going. Atmospheric pressure operation is satisfactory, but lower or higher pressures can be accommodated. Investment in equipment for vacuum operation or very high pressure operation is not necessary.

The nitration reaction initiates and, as it continues, it liberates heat which azeotropically distills a two-phase liquid containing water with a small amount of nitric acid and benzene with a small amount of nitrobenzene through line 6 from the reaction mixture. Vapor from the distillation passes to condenser 21 where it is condensed, the condensate passing through line 7 to overhead decanter 22. Overhead decanter 22 separates the condensate into two layers—an organic layer and an aqueous layer. Normally, the aqueous layer is discarded through waste line 9 and the organic layer is returned through lines 11 and 13 and lines 12 and 14 to reaction vessel 20, as discussed below. The relative proportions of benzene and nitrobenzene in the organic phase of the azeotrope will determine whether the top phase in overhead decanter 22 is the aqueous phase or the organic phase. Adjustments can be made in the process to assure that it is the organic phase which is recycled to reaction vessel 20.

Circulation of the reaction mixture to bottoms decanter 23 continues out overflow 26 and through line 16 during the period of feeding nitric acid and benzene.

In bottoms decanter 23, the reaction mixture separates into two layers — one organic and the other inorganic. As necessary to maintain the reactor at a desired operating volume, organic material is withdrawn from bottoms decanter 23 through line 15 while the inorganic layer is recycled to the reactor. Nitrobenzene product is readily refined from this withdrawn material. Benzene distilled off in the refining can be recycled to reaction vessel 20. Due to the temperatures used for the reaction and the low nitric acid concentration, relatively little dinitrobenzene forms. This is desirable since dinitrobenzene is a troublesome impurity in nitrobenzene, concentrating in a heel when the nitrobenzene is converted to aniline. The dinitrophenol oxidation product that is formed is not so troublesome.

Make-up sulfuric acid can be added through line 1 as needed to replace the small amount that may go out line 15 with the product.

If needed, especially during start-up, inert gas may be added through line 18 to flush off-gases such as nitrogen oxides out line 8 at the top of condenser 21. Condenser 21 can be cooled by any suitable means, normally by a supply of cold water, not shown.

The temperature of the reaction mixture in reaction vessel 20 is largely a result of the exothermic nature of the reaction of benzene and nitric acid. Additional means may be provided to permit control of the temperature to obtain the advantages of the invention. Internal or external heating coils fed by steam can be provided for reaction vessel 20. Additionally or alternatively, a variable proportion of the benzene feed and the benzene recycle can be vaporized in vaporizer 24. The subsequent condensation of the benzene adds heat to the reaction mixture. Thus, the fresh benzene feed can be split with part going through lines 5 and 14 to vaporizer 24 and thence to spargers 25 at the bottom of reaction vessel 20 and part going directly as a liquid through line 4 to reaction vessel 20. Also, recycle benzene from overhead decanter 22 from line 10 can be split with part going through lines 12 and 14 to vaporizer 24 and thence to sparger 5 and part going as a liquid to lines 11 and 13 to reaction vessel 20.

Suitable control means involve measuring the temperatures at various points in the system, especially in reaction vessel 20. The temperature determines the amount of azeotropic distillation and thus the concentration of the sulfuric acid in the reaction vessel. By manual means or automatic feedback, the gas-liquid split of benzene through vaporizer 24 and direct to reaction vessel 20 can be used to obtain the desired temperature. Alternatively, internal coils or external heat exchanger jackets, not shown, can be used to add heat. Also, the feed rate of benzene and nitric acid control the exothermic contribution to the temperature.

It is desirable to keep as low as feasible the nitric acid concentration in the azeotrope. This can be measured in line 6 or between line 6 and waste water line 9. The temperature in reaction vessel 20 and the interrelated sulfuric acid concentration influence the nitric acid concentration in the azeotrope and can be controlled to minimize the nitric acid concentration.

EXAMPLE 1

In this example benzene was continuously nitrated at 130°C. and atmospheric pressure to give essentially mononitrobenzene.

The nitrator was precharged with a mixture of 440 parts of $H_2SO_4$ (100% basis), 196 parts of water, and 300 parts of nitrobenzene. The mixture, at rest, occupied about three-fourths of the reactor. To this mixture was fed over a period of 14½ hours 2130 parts of 70 percent $HNO_3$ and 2100 parts of virgin benzene (boiling point approx. 80°C.). The benzene and nitric acid were fed at ambient temperature to the reactor at 130°C. and about atmospheric pressure. In the reactor, part of the benzene was nitrated to mononitrobenzene, producing water as a byproduct. The water, as steam, and other process vapors left the reactor to a condenser, the condensate of which consisted of 1020 parts of an aqueous phase containing 1.3 percent nitric acid and 3305 parts of an organic phase (3060 parts of benzene and 245 parts of nitrobenzene). The phases were separated in the overhead decanter, the aqueous phase being purged and the organic phase being recycled at ambient temperatures to the reactor.

The operating level in the reactor was held constant by withdrawal of the reactor liquid. The liquid withdrawn passed to the bottoms decanter from which an organic phase consisting of 2850 parts of mononitrobenzene, 220 parts of benzene, and trace amounts of dinitrobenzene and dinitrophenol was transferred to product storage. Also leaving the bottoms decanter was an aqueous layer of sulfuric acid which was recycled to the reactor.

During the operating period nitrogen oxides accumulating in the condenser were purged by feeding nitrogen to the reactor vapor space.

EXAMPLES 2–6

A series of reaction mixtures were prepared from approximately equal volumes (1500 cc) of nitrobenzene and 65 percent sulfuric acid. Each mixture, contained in a 1-gallon reaction vessel, was heated with agitation to a desired reaction temperature in the range 120° to 150°C. At the indicated temperature, feed of a partially vaporized stream of benzene containing some nitrobenzene was started through a sparger near the bottom of the vessel. Shortly thereafter feed of an aqueous nitric acid solution was also started. These feeds were continued under conditions such that the vapors leaving the reactor could be condensed without significant refluxing back into the reaction vessel, and the condensed phases were then decanted. The decanted organic phase containing benzene and nitrobenzene was used, together with new benzene, as the stream to be partially vaporized and fed through the sparger. The decanted aqueous phase was collected externally and analysed for nitric acid content. The feed rate through the sparger was adjusted to make the rate of collection of decanted aqueous phase, taken as water, equivalent to the rate of feed to the system of water with the nitric acid plus the rate of formation of water in the nitration reaction.

The liquid contents of the vessel were allowed to overflow into the outlet as their volume, augmented by the formation of nitorbenzene, increased above the original level charged. The two liquid phases in this overflow stream were separated by decantation. The sulfuric acid phase was sampled for analysis and returned to the reaction vessel. The organic phase, containing mainly nitrobenzene, was sampled and held as product. The temperature of the contents of the reaction vessel was controlled through addition of heat from an external electric mantle. After the passage of a few hours the reaction system reached a steady state with respect to the compositions being sampled, and these results were recorded as characteristic of the particular temperature, sulfuric acid concentration, nitric acid feed rate and nitric acid concentration being used. In a series of experiments conducted in this way, the following data were obtained:

TABLE I

|  | I | II | III | IV | V |
|---|---|---|---|---|---|
| Temperature, °C. | 120 | 140 | 150 | 130 | 149 |
| Percent $H_2SO_4$ | 55.2 | 65.6 | 69.2 | 66.1 | 66.7 |
| $HNO_3$ feed rate, g/min. | 14.8 | 14.1 | 14.6 | 13.7 | 15.0 |
| Product percent nitrobenzene | 92 | 95 | 97 | 92 | 97 |
| Percent $HNO_3$ in overhead water | 14.4 | 2.1 | 2.9 | 3.5 | 1.5 |

The above data illustrate the advantages in operation at higher temperature (140° to 150°C. vs. 120°C.) to obtain higher conversion of benzene to nitrobenzene and reduced loss of nitric acid in the water phase taken overhead. A temperature of 140°C. and a sulfuric acid concentration of about 65.6 percent seem about optimum.

EXAMPLE 7

Table II below presents flow rates in weight units for the various lines shown in the drawing with the reaction vessel operating at 140°C. and with a sulfuric acid concentration of about 65 percent.

TABLE II

| Stream | 1 | 3 | 4 | 6 | 7 | 9 |
|---|---|---|---|---|---|---|
| Benzene | — | 13,674.7 | 4,230.6 | 23,610.7 | 23,573.2 | 18.5 |
| Nitrobenzene | — | — | — | 13,382.2 | 13,382.2 | 10.0 |
| Water | 6,205.0 | — | — | 9,120.4 | 9,118.0 | 9,040.9 |
| Sulfuric | — | — | — | — | — | — |
| Nitric | 10,565.2 | — | — | 178.1 | 178.1 | 178.1 |
| Gases | — | — | — | 39.0 | — | — |
| Total | 16,770.2 | 13,674.7 | 4,230.6 | 46,330.4 | 46,251.5 | 9,247.5 |

| Stream | 10 | 11 | 12 | 13 | 14 | 15 | 16 | 17 |
|---|---|---|---|---|---|---|---|---|
| Benzene | 23,554.8 | 7,287.3 | 16,267.5 | 11,517.9 | 25,711.6 | 865.7 | 865.7 | — |
| Nitrobenzene | 13,372.2 | 4,137.0 | 9,235.2 | 4,137.0 | 9,235.2 | 20,000.0 | 20,000.0 | — |
| Dinitrophenol | — | — | — | — | — | 102.1 | 102.1 | — |
| Water | 77.1 | 23.8 | 53.2 | 23.8 | 53.2 | 20.0 | 9,823.5 | 9,803.5 |
| Sulfuric | — | — | — | — | — | 136.0 | 18,530.0 | 18,394.0 |
| Nitric | — | — | — | — | — | 24.1 | 56.8 | 32.6 |
| Total | 37,004.0 | 11,448.1 | 25,555.9 | 15,678.7 | 35,000.0 | 21,148.0 | 49,378.1 | 28,230.1 |

What is claimed is:

1. A continuous process for the mononitration of benzene comprising the steps of feeding fresh benzene and nitric acid in about stoichiometric proportions to produce nitrobenzene into a reaction vessel containing nitrobenzene, benzene and sulfuric acid;

mixing the ingredients in the reaction vessel and reacting benzene and nitric acid at a temperature in the range of about 120° to 160°C.;

vaporizing an azeotrope of a water phase containing nitric acid and a hydrocarbon phase containing benzene and nitrobenzene, and removing the azeotrope from the reaction vessel;

condensing the azeotrope, separating the aqueous phase from the hydrocarbon phase, feeding excess benzene into the reaction vessel to maintain the total input of benzene to the reaction vessel above stoichiometric relative to the nitric acid fed thereto and to enhance the vaporization of the azeotrope, said excess benzene being either recycle stream of the hydrocarbon phase from the condensed azeotrope, or fresh benzene, or a combination of both; and withdrawing from the reaction vessel a mixture of acids and nitrobenzene, separating the nitrobenzene as product, and recycling the acids to the reaction vessel;

with the sulfuric acid concentration in the reaction vessel being controlled within the range of 55 to 70 percent by weight relative to the sulfuric acid plus water present by adjusting one or more of the reaction temperatures and the rates of feeding nitric acid and benzene to the reaction vessel.

2. A process according to claim 1 wherein the amount of water separated from the condensed azeotrope is about equal to the amount of water provided by the nitric acid feed and the reaction of nitric acid and benzene in the reaction vessel.

3. A process according to claim 1 in which the reaction is conducted in the temperature range of about 130° to 150°C.

4. A process according to claim 3 in which the reaction is conducted at about 140°C. and the concentration of the sulfuric acid in the reaction vessel is controlled at about 65 percent by weight relative to the sulfuric acid plus water present.

5. A process according to claim 1 in which the aqueous and hydrocarbon phases are separated from the azeotrope by decantation.

6. A process according to claim 1 in which the acids and nitrobenzene are separated by decantation.

7. A process according to claim 1 in which at least part of the mixing of the ingredients in the reaction vessel is achieved by sparging benzene up through the other ingredients.

8. A process according to claim 1 in which the reaction is operated at a total pressure of at least about 1 atmosphere.

9. A process according to claim 1 in which the reaction is operated at a total pressure about in the range of 1 to 2 atmospheres.

10. A process according to claim 1 in which the nitric acid concentration in the aqueous phase of the condensed azeotrope is kept below about 4 percent by weight.

11. A process according to claim 10 in which the nitric acid concentration in the aqueous phase is kept below about 2.5 percent by weight.

12. A process according to claim 1 in which all of the hydrocarbon phase condensed from the azeotrope is recycled to the reaction vessel.

13. A process according to claim 1 in which the hydrocarbon phase condensed from the azeotrope is removed from the process.

* * * * *